No. 861,304. PATENTED JULY 30, 1907.
D. M. MOTHERWELL.
LAWN EDGE TRIMMER AND TRENCH CUTTER.
APPLICATION FILED APR. 2, 1907.
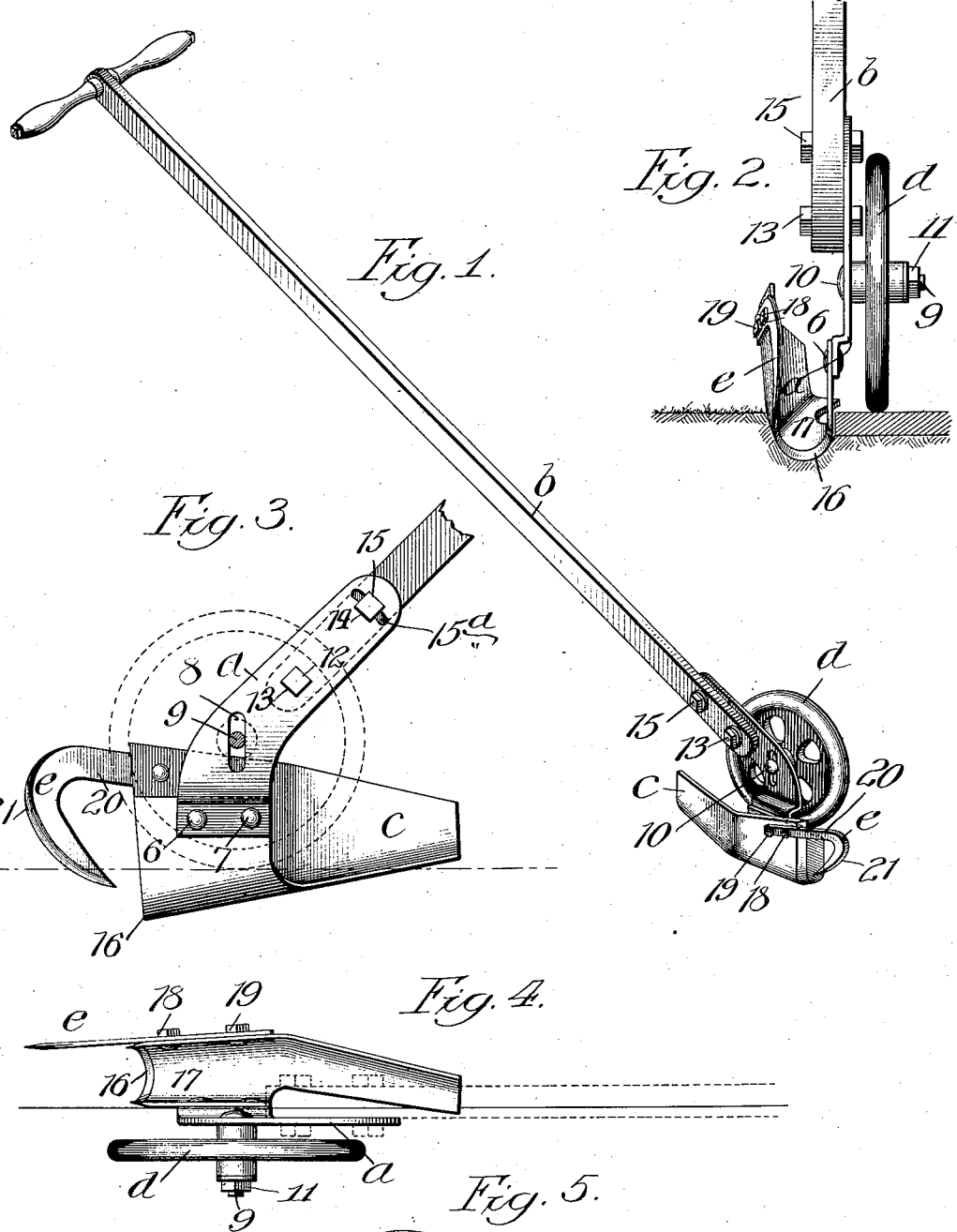
Witnesses:
Inventor:
David M. Motherwell,
By Robert Catherwood
Atty.

UNITED STATES PATENT OFFICE.

DAVID M. MOTHERWELL, OF CHICAGO, ILLINOIS, ASSIGNOR TO THE WHITMAN & BARNES MANUFACTURING COMPANY, OF AKRON, OHIO, A CORPORATION OF OHIO.

LAWN-EDGE TRIMMER AND TRENCH-CUTTER.

No. 861,304.  Specification of Letters Patent.  Patented July 30, 1907.

Application filed April 2, 1907. Serial No. 366,045.

*To all whom it may concern:*

Be it known that DAVID M. MOTHERWELL, a citizen of the United States, residing at Chicago, in the county of Cook and State of Illinois, has invented certain new and useful Improvements in Lawn-Edge Trimmers and Trench-Cutters, of which the following is a specification, reference being had therein to the accompanying drawings.

My invention relates to lawn edge trimmers and trench cutters. Its object is to provide a light, simple and economical device, adapted to cut out or trench the edges of lawns along cement walks, drives or like areas and regularly and automatically deposit the cuttings in a convenient place for removal, without obstructing or clogging the mechanism or interfering with the even operation of the cutting edges.

In the accompanying drawings, I have shown a device embodying my invention in one of its preferred forms, and provided with a colter or knife attachment especially adapted for use on grass lawns.

Figure 1 is a perspective of the device as a whole; Fig. 2 is a front view of the lower portion showing the parts adjusted to trim the edge of a lawn and walk of substantially the same height, leaving a shallow gutter between; Fig. 3 is a side view of the parts shown in Fig. 2, illustrating, in particular, my preferred mode of adjustment; Fig. 4 is a top view, and Fig. 5 is a side view of a modified or alternate form of colter or detachable grass cutter.

The device, in its preferred form, consists, in general, of a single wheel carriage or frame which is pushed in front of the operator by means of a long handle, the wheel being adjustable vertically, with means for locking it in its bearings to the carriage at various desired heights from the ground, and a share comprising a U shaped knife with a closed bottom and sides, the side farthest from the frame or carriage being extended to the rear and bent towards it at an angle to the path of travel so as to form a deflector for the cuttings while the side nearest the carriage is cut away in the rear at a point opposite the deflector surface, leaving the space bounded by the share open from front to rear so that the cuttings from the forward edge of the share feed freely towards the rear, their course being gradually deflected to throw them in a line on the walk, where they may be conveniently removed. The share thus cuts out a trench, gathers the cuttings as the device proceeds and deposits them in a species of furrow behind the wheel. The long handle is preferably made adjustable to different heights and a knife is provided in advance of the share to assist in the cutting operation, especially of matted overhanging grasses.

In the drawings $a$ indicates a frame or carriage, to which the push bar handle $b$ is fastened, preferably by bolts 12, 14 and nuts 13, 15. The handle is preferably made adjustable to various convenient heights by the vertical slot $15^a$ in which the headed bolt 14 may be locked at any desired point by means of the nut 15. The depending share $c$ may be made integral with the frame $a$ or bolted thereto at the points 6 and 7. The device is carried on a runner truck or wheel $d$ on headed shaft 9. It is adjustably secured to the frame $a$, so that the device may be set to operate at different heights, by means of the vertical slot 8 and the nut 11 on the threaded end of shaft 9, the other end being headed at 10. By loosening the nut 11 the shaft 9 can be adjusted to any point in the slot and locked by tightening up the nut 11. The forward edge of the depending share $a$ is made U-shaped and provided with a hard cutting edge 16. The bottom is closed so as to form a short gutter 17 and the side, farthest from the wheel $d$, is brought up to form a wing or deflector which, for a short distance lies parallel to the wheel, is deflected and tapered to the rear and brought under so as to continue the gutter 17 in this deflected course, also giving it a slight upward inclination so as to throw the cuttings upwards and to the rear of the wheel $d$, the side adjacent to the carriage being cut away opposite the plane of deflection of the opposite side of the share $c$ to give a free and unobstructed outlet.

Where the edges of lawns or grounds with tough or long matted grass are to be trimmed, it may be found desirable to provide a colter or forward cutting attachment. In the drawings I have shown two forms of such attachment adapted to be bolted to the share at the points 18 and 19. One form, the cutter attachment $e$ is provided with a shank 20 and a forward cutting edge 21, while another, the cutter $f$, is provided with a shank 22 upon the forward end of which is mounted a revolving cutting wheel 23.

The operation of my device is as follows: The wheel or runner is placed upon the walk or lawn around which it is desired to trim and the depth to which the cutting or outlining is to be done determined. The share is then set at the proper height by loosening the nut 11, adjusting the shaft 9 at the desired point in the slot 8 and locking it therein by tightening the nut 11. The device is then pushed forward by the operator by means of the handle $b$. The edge 16 of the share cuts the sod, the cuttings are forced along the gutter 17, deflected towards the wheel and thrown up in a continuous mound at the rear thereof.

I prefer to construct the share of steel hardened along the U-shaped edge, the handle of wood and the other parts of cast iron.

I am aware that many modifications of my device will suggest themselves to those skilled in the art, and I do not wish to be understood as in any way limiting myself to the preferred form shown, but

What I claim and desire to secure by Letters Patent is:

1. In a lawn edge trimmer, a side wheel, a depending share carried on one side thereof having a closed bottom, a forward U-shaped cutting edge and upright sides, the side farthest from said wheel being extended in the rear thereof and deflected towards it at an angle to the path of travel thereof, the side adjacent to said wheel having an opening opposite the points where said first-mentioned side is deflected, substantially as described.

2. In a lawn edge trimmer, in combination with a carriage, a share, secured on one side of said carriage and depending therefrom, having a U-shaped forward cutting edge, a closed bottom, a side extended rearwardly to form a wing deflected towards said carriage at an angle to the line of travel thereof and a side adjacent to said carriage being cut away opposite said angle, the space bounded by said share being open from front to rear, substantially as described.

In testimony whereof I hereunto affix my signature in presence of two witnesses.

DAVID M. MOTHERWELL.

Witnesses:
CHARLES L. HINE,
ARTHUR G. GREENE.